Figure 1:
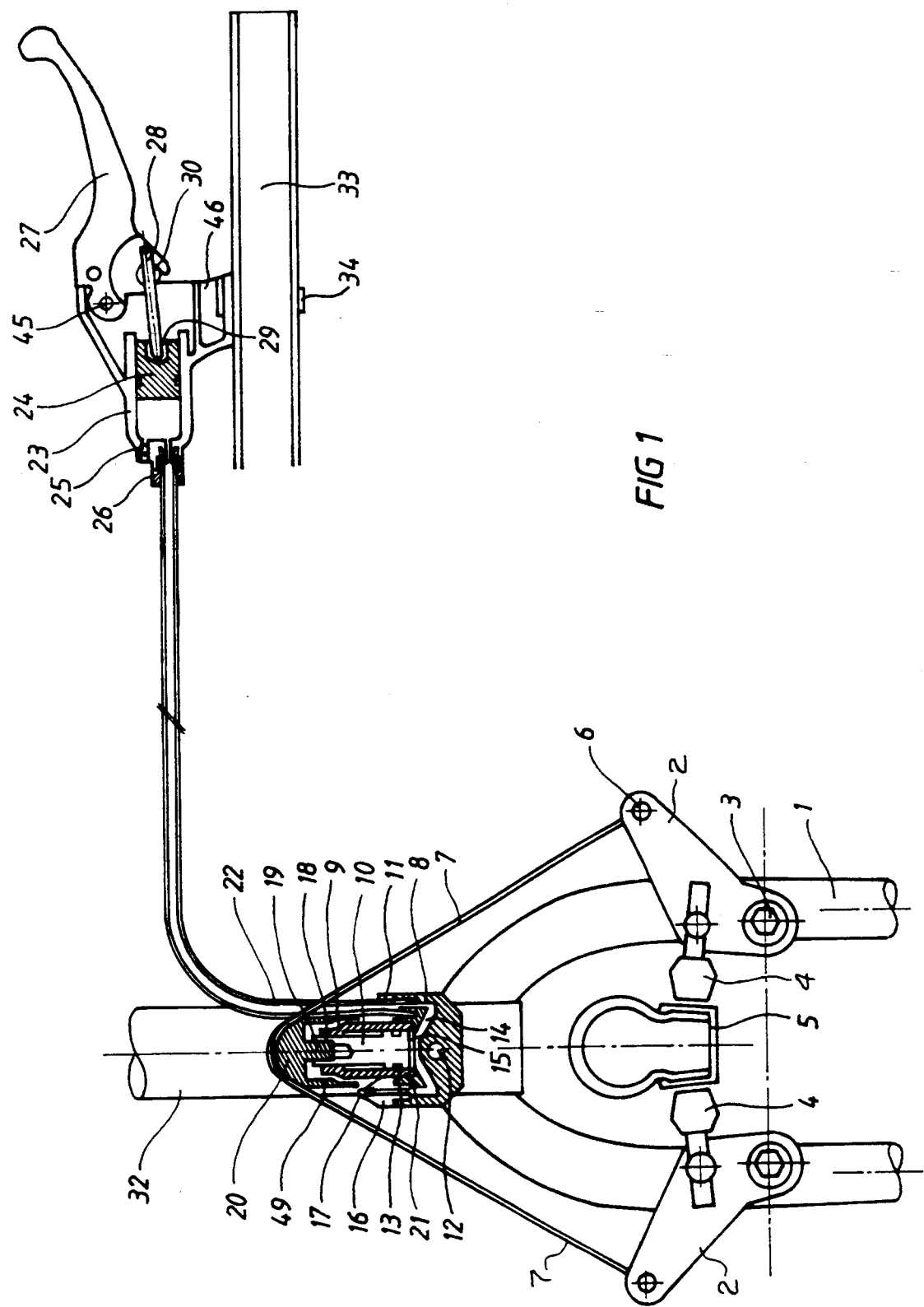

United States Patent [19]
Walte

[11] Patent Number: 5,368,136
[45] Date of Patent: Nov. 29, 1994

[54] HYDRAULIC BRAKES FOR BICYCLES

[76] Inventor: Willi Walte, Schawalderhof 84, CH-9430, St. Margarethen, Germany

[21] Appl. No.: 147,158
[22] Filed: Nov. 3, 1993

[30] Foreign Application Priority Data
Nov. 3, 1992 [DE] Germany .......................... 4237110

[51] Int. Cl.$^5$ .............................................. B62L 1/06
[52] U.S. Cl. ................................ 188/24.22; 188/344; 188/2 D
[58] Field of Search ............ 188/344, 2 D, 24.11, 188/24.22, 24.12, 24.13, 24.14, 24.15, 24.16, 24.17, 24.18, 24.19, 24.21, 106 F, 71.1, 72.6, 72.9, 71.4, 349; 92/99; 60/594; 303/9.62

[56] References Cited

U.S. PATENT DOCUMENTS

| | | | |
|---|---|---|---|
| 3,338,337 | 8/1967 | Freeland et al. | 188/344 |
| 3,899,056 | 8/1975 | Doerr | 188/344 |
| 3,899,057 | 8/1975 | Carre | 188/344 |
| 3,921,764 | 11/1975 | Mathauser | 188/24.14 |
| 3,993,174 | 11/1976 | Williams et al. | 188/344 |
| 4,175,648 | 11/1979 | Sule | 188/344 |
| 4,391,353 | 7/1983 | Mathauser | 188/344 |
| 4,483,421 | 11/1984 | Kennelly | 188/2 D |
| 4,585,094 | 4/1986 | Rottenkolber et al. | 188/344 |
| 4,615,415 | 10/1986 | Mathauser | 188/344 |
| 4,632,225 | 12/1986 | Mathauser | 188/344 |

FOREIGN PATENT DOCUMENTS

| | | | |
|---|---|---|---|
| 3325970 | 1/1985 | Germany | 188/24.12 |
| 3416726 | 11/1985 | Germany | 188/24.21 |

*Primary Examiner*—Douglas C. Butler
*Attorney, Agent, or Firm*—Paul H. Gallagher

[57] ABSTRACT

A hydraulic brake for bicycles consisting essentially of a brake lever fastened on the steering column of a bicycle which works on a master piston movably arranged in a master cylinder, wherein the chamber in the cylinder is filled with hydraulic fluid, which is conducted by way of a hydraulic tube into the chamber of a working cylinder, in which a main piston is movably arranged, which works on the brake shoes of the bicycle. Along with lower manufacturing costs, there is easy interchangeability and a good reliability in servicing the brake. A single working cylinder is fastened above the fork of the bicycle and the main piston is connected with a control head, over which a traction cable is directed, which works on the usual brake shoes.

11 Claims, 2 Drawing Sheets

HYDRAULIC BRAKES FOR BICYCLES

The object of the present invention is to provide a hydraulic brake for bicycles. Such a hydraulic brake is known as a front wheel or rear wheel brake for bicycles, in which at the steering column, there is attached a brake lever which works on a master piston which is adjustably arranged in a master cylinder. The cylinder chamber, defined by the cylinder and master piston, is filled with a hydraulic fluid, and the hydraulic pressure thereby increased works by means of a hydraulic tube on at least one working cylinder, whose one or several main pistons work on the brake shoes of the bicycle.

It is known to provide two working cylinders with a corresponding main piston, whereby the main piston works directly on the brake block. With this known design form, the working cylinder with its moveably arranged main piston, is constructed as a brake saddle and the main piston works directly on the brake shoe.

The disadvantage of that design form is that it is costly since on each brake block there is attached a working cylinder with an attached main piston, which significantly raises the production costs. A further disadvantage is the relatively great susceptibility to wear and tear, because the entire arrangement is housed in the dirt-collecting region of the vehicle. A further disadvantage is that because of the constant relatively high brake pressure, the front wheel fork must be specially strengthened, because the main pistons that work against each other, stress the fork and the fastening screws necessary for supporting the cantilever brake shoe, to the point of bending.

A further disadvantage of the known arrangement is that the available brake devices are difficult to retrofit with the known hydraulic brakes because the dimensions of the different forks and wheel rims might require an exchange of the main pistons with the thereto attached brake shoes.

It is therefore the object of the present invention to so construct a hydraulic brake for bicycles or other two-wheeled vehicles, characterized in lower cost and easily exchangeable and more securely operating brakes.

An important feature of the invention is a single working cylinder attached at the front or rear wheel fork of the bicycle, and the main piston of this working cylinder is connected with a working head, which is connected to traction cables, which set directly on cantilever brake shoes.

In the present case, there is the advantage that the cantilever brake shoes, which normally are present on bicycles, and the related traction cables, can be retained, and for the retrofitting step, an available mechanical cantilever brake of the working cylinder is attached at the front or rear wheel fork, and then connected with the master cylinder in the brake lever by means of a hydraulic tube.

This provides the advantage of a simple interchangeability of the entire arrangement, because the working cylinder can be screwed into the fastening hole available on the bicycle, whereby—as referred to above—the cantilever brake shoes with the related traction cables remain unaltered.

Thereby the ideal efficiency of the cantilever brake shoes is combined with a maintenance free and practically friction free hydraulic operation, which allows several advantages:

By means of the triangle control of the traction cable, the brake pressure, which works on the cantilever brake shoes, is evenly transferred over the control head of the working cylinder, whereby this leads to an even pressure of the cantilever brake shoes. Thereby there is no longer the danger that the frame must be oversized if a hydraulic brake is to be built thereon, since the cantilever brake shoes are preserved unchanged on the vehicle, as is the sizing of the front or rear wheel fork.

In addition there is the further advantage that now, by means of the use of a single working cylinder with an attached operating head, there is an essentially smaller cost in manufacture and assembly, because it can be fastened directly on the existing fastening hole for the mechanical operating device of the cantilever brake shoes.

A further advantage is that the working cylinder with the operating head is brought out of the wheel region where it is susceptible to soiling and fastened on the cross bar, in an upper position toward the handle bar.

Thereby there is no longer the susceptibility to soiling, as with the previously mentioned known working cylinders, which were directly attached in the brake shoes themselves.

The previously mentioned fastening hole at the frame, which serves for holding the single working cylinder, serves simultaneously—in a known manner—for holding the guard plate and the headlight.

With the use of a single working cylinder in the middle region between the front wheel and rear wheel fork, and which works evenly on both traction cables, there is above all the advantage that an ideal distribution of the brake power on both brake shoes results, and as a result, the brake cables can be very easily engaged by shifting the operating head of the brake; when for example the operating head is constructed as a controlling wheel, which meshes with a threaded peg in an associated threaded hole in the main piston, the pedal travel of this operating head can be engaged by turning the regulating wheel. Thereby the power brake can easily be shifted.

Disclosed herein are two different design forms, namely in the first design form the traction cable is directed from the left brake shoe over the operating head to the right brake shoe, whereby the operating head takes over the reversing of the traction cable, while in a second design from, the traction cables are connected at one end with the swingable part of the brake shoe, and at the other end, securely yet turnably connected with the operating head. The engagement of the traction cables is thereupon accomplished with a regulating screw, without the traction cables needing to be removed form the operating head.

In another design of the invention, an additional pressure regulating device is provided with which it is impossible to set the pressure in the cylinder chamber of the working cylinder. Herein, a pressure regulating piston is used which is telescopically arranged in a further cylinder chamber, and under the load of an adjustable pressure spring the hydraulic fluid is prepressured in the chamber of the working cylinder.

BRIEF DESCRIPTION OF THE INDIVIDUAL FIGURES OF THE DRAWINGS

FIG. 1, schematic cross section including a hydraulic brake in a first design form.

Figure 2:
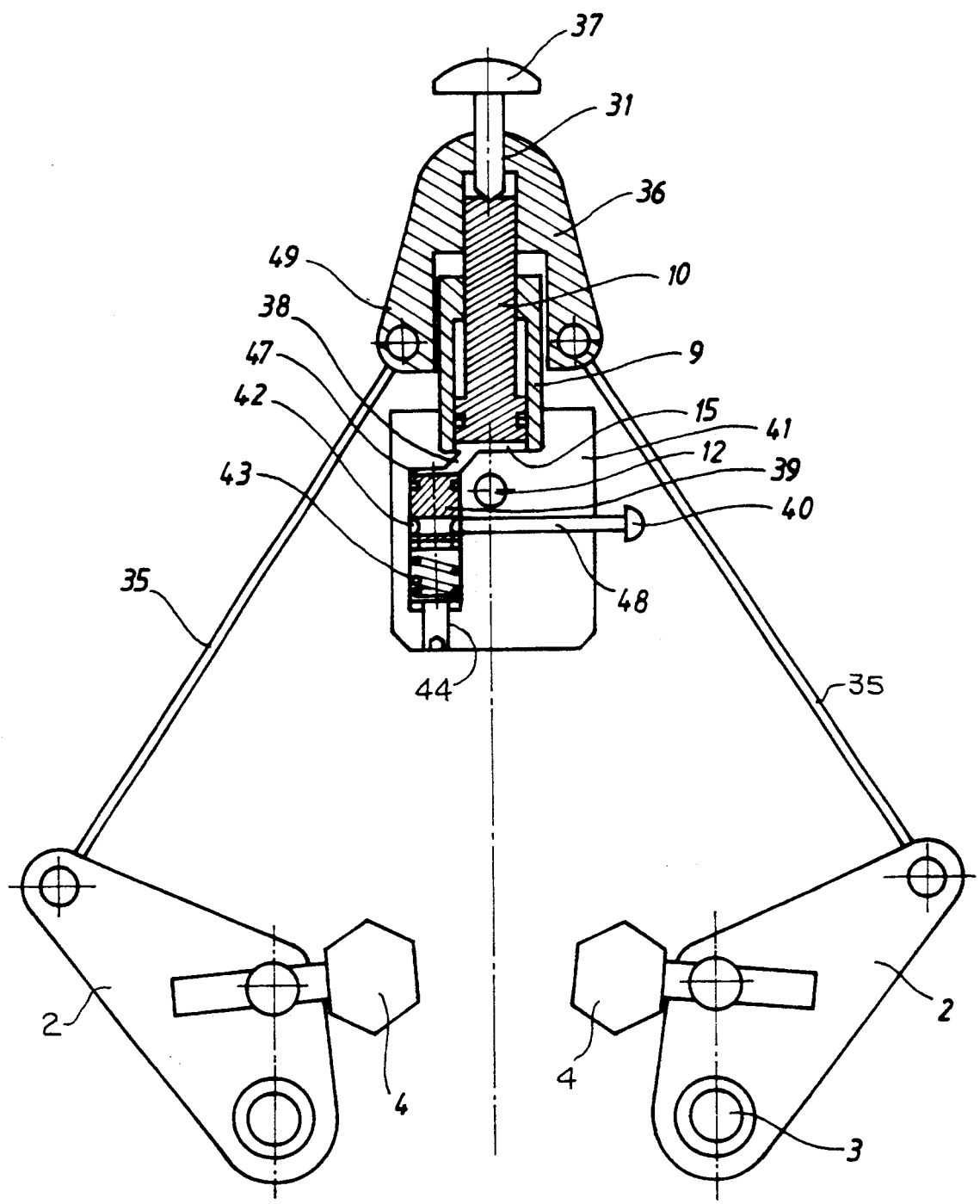

FIG. 2, an enlarged cross section through a working cylinder in a second design form.

In FIG. 1, a fork 1 of a bicycle is connected with a cross bar 32. In the region of the connection between these two parts, there is a fastening hole 12 through which a screw (not shown in detail) grips and fastens the working cylinder 9 of the hydraulic brake.

At the fork 1, cantilever brake shoes 2 are, in a known fashion, swingably held in the pivot positions 3 and are provided with brake blocks 4. The brake blocks 4 work in a known fashion on the wheel rim 5 of either a front or rear tire.

At the free swingable ends of the brake shoes 2, are fastened rods 6 in which an end of a penetrating traction cable 7 is inserted. This traction cable 7 is directed over an operating head of the hydraulic brake which, in the form of FIG. 1, is constructed as a regulating wheel 20. The regulating wheel 20 has a lower threaded stem 19, which is screwed into a corresponding hole 18 of a main piston 10. The main piston 10 is sealed by an O-ring 13 in the chamber 15 of the working cylinder 9, and is moveable therein, under the influence of the hydraulic fluid.

A support 8 is secured to the working cylinder 9, providing mutual connection in the region of a threaded hole 21. The hydraulic fluid is thereby directed by means of a hydraulic tube 22, which is fastened at the support 8 by means of a hose clamp screw 11. The hose clamp screw 1I closes up the hydraulic tube by means of a cone opposite the support 8. The hydraulic tube 22 feeds into a channel 14, the latter feeding into the chamber 15.

On the opposite-lying side, the channel 14 leads to a filler nipple 16, which on its upper side is provided with a spring loaded closing ball 17.

The hydraulic pressure is generated by a master cylinder 23 in which a master piston 24 is movably housed, and closed off with an O-ring. The master piston 23 has a hole 29 in which the end of a master piston rod 28 adjustably fits. This master piston rod 28 is constructed as a thread screw and is adjustably held in a threaded nut 30 which is turnably arranged in the moveable part of a brake lever 27. The brake lever 27 is swingably housed in a drag bearing 45 in a main housing 46, and the master piston rod 28 activates the master piston 24 in the master cylinder 23. The hydraulic tube 22 is fastened and closed off by a hose clamp screw 26 at the main housing 46. The main housing 46 is fastened by a hose clamp 34 on the steering column 33 of the bicycle.

By activating the brake lever 27 the master piston 24 (FIG. 1) is thereby moved to the left, and the pressure in the chamber of the master cylinder 23 increases and is instantaneously directed through the hydraulic tube 22 into the chamber 15 of the working cylinder 9. Thereby the main piston 10 is pushed upward and thereby also the activating head, which is constructed as the regulating wheel 20. Thereby the traction cable 7 is simultaneously activated. In this context it is important that the cantilever brake shoes 2 with the related parts (brake block 4, pivot element) are retained and need not be replaced with other parts.

For preadjusting the brake pressure, the regulating wheel 20 can be activated after lifting the traction cable 7, whereupon the traction cable is thereafter again laid on the regulating wheel 20.

For filling the brakes, hydraulic fluid is injected into the pressureless system through the screwed in filler nipple 16 over the closing ball 17, after opening the vent screw 25. The filling of the system is continued so long as hydraulic fluid exits out of the vent screw 25, and thereafter the operator closes the vent screw.

In FIG. 2 the same parts are provided with the same reference numbers.

The working cylinder 9 has a similar main piston 10, but this main piston is provided with a different operating head. The operating head is here constructed as a suspension stirrup 36, to which traction cables 35 are coupled.

The traction cables 35 are of secure, constant length and are thereby symmetrically activated and again released.

For controlling the brake power, a regulating screw 37 is provided which is screwed into a threaded hole 31 of the suspension stirrup 36 and which supports itself with its stud-sided ends on the upper side of the main piston 10.

In the following a pressure regulating system is described with which it is possible to preset the brake pressure.

In this construction, in fluid conducting connection to the previously described channel 14, a further pressure regulating channel 38 is present, which feeds into a chamber 47 in the support 41. In the chamber 47 a pressure regulating piston 39 is arranged in a manner that it can be moved and closed, and is engaged by a compression spring 43. The compression spring is supported with one end against the pressure regulating piston 39 and with its other end against a regulating screw 44. By means of screwing in or out of the pressure regulating screw 44, the pressure strength of the pressure spring 43 is set and thereby also the pressure of the pressure regulating piston 39 on the hydraulic fluid in the chamber 15. This enables a presetting of the hydraulic pressure in the entire system.

In order to block the engagement, in support 41 a rotary element or plunger 40 is movably arranged in a hole 48, and its stud-sided ends can be brought into connection with a snap ring groove 42 in the circumference of the pressure regulating piston 39. Thereby the displacement of the pressure regulating piston 39 can be arrested.

Upon activating the brakes, the pressure is increased in the chamber 47, and the pressure regulating piston, acting against the pressure spring 43, moves downward, whereby the activation of the brake works does not occur so abruptly.

In order to disconnect this pressure regulation, a rotary element 40 is provided, which for example in wet weather is activated, whereby the pressure regulating piston 39 is arrested and the brake pressure works directly in the chamber 15 and thereby on the main piston 10.

A further advantage of the invention, in the use of a single working cylinder and a corresponding single main piston, lies primarily in that with use of the customary cantilever brakes, even changing the wheel is especially easy, which with the previously known hydraulic brakes, with which the main pistons were built directly in the brake saddle, was not possible. In those cases the brake saddle must be removed as well, which in not necessary with the device of the present invention. In both forms, FIGS. 1 and 2, the operating head 20, 36 additionally shows lateral flange regions 49, which overlap the working cylinder 9 from above and so protect it against dirt.

I claim:

1. A hydraulic brake for a bicycle having a steering column, and having brake shoes, a master cylinder with a master piston and master cylinder chamber therein, a working cylinder with a main piston movable therein and a working cylinder chamber therein, the working cylinder being operably connected with the brake shoes, the brake including a hydraulic tube connecting the chambers of the cylinders and having hydraulic fluid in the chambers and tube, characterized in that, the brake includes a brake lever mounted on the steering column, the bicycle includes a fork (1) adjacent the associated wheel to be braked, the working cylinder (9) is constituted by a single cylinder and is mounted to the fork, and the bicycle includes an operating head (20) and traction brake cables (7) operably interconnecting the operating head and the brake shoes, and the main piston (10) in the working cylinder being operably connected with the operating head.

2. A brake according to claim 1 further characterized in that, the operating head (20) is constructed as a regulating wheel which is adjustably housed in a piston hole (18) of the main piston (10).

3. A brake according to claim 1 further characterized in that, the bicycle includes right and left shoes, and wherein the traction brake cables (7) are connected with the shoes respectively and connected together and extending over and operable engaging the operating head.

4. A brake according to claim 1 further characterized in that, the operating head is constructed as a suspension stirrup (36), the suspension stirrup has an upper threaded hole (31), the brake includes a regulating screw (37) gripped in the threaded hole and having a threaded pin with a pointed end on and operably engaging the main piston (10).

5. A brake according to claim 4 further characterized in that, the shoes (2) are pivotally mounted at one end and have their other ends free and movable, and wherein said traction cables (35) having one end secured to the suspension stirrup (36) and their other ends connected with said free movable ends of the brake shoes.

6. A brake according to claim 1 further characterized in that, the operating head (20, 36) has side flange elements (49) overlapping the working cylinder (9, 10) at an upper end of the latter thereby protecting the latter against dirt.

7. A brake according to claim 1 further characterized in that, the brake includes a pressure regulating device (38, 47, 39) for regulating the hydraulic pressure.

8. A brake according to claim 7 further characterized in that, the pressure regulating device (38, 47, 39) includes a support (41) in which a pressure regulating chamber (47) is formed and is connected with the chamber (15) of the working cylinder (9) operable for conducting hydraulic fluid, and which includes a compression spring (43) between the regulating piston (39) and the working cylinder (9).

9. A brake according to claim 8 further characterized in that, the brake includes means for adjusting the compression of the spring (43) for correspondingly controlling the regulating piston (39).

10. A brake according to claim 8 further characterized in that, the brake includes means for arresting the displacement of the pressure regulating piston (39).

11. A brake according to claim 1 further characterized in that, the brake includes a cone opposite the support (8), and the brake further includes a hose clamp screw (11) operable in conjunction with the cone, for closing off the hydraulic tube (22).

* * * * *